(12) United States Patent
Cao et al.

(10) Patent No.: US 10,720,617 B2
(45) Date of Patent: Jul. 21, 2020

(54) COMPOSITE END PLATE AND BATTERY MODULE

(71) Applicant: Contemporary Amperex Technology Co., Limited, Ningde, Fujian (CN)

(72) Inventors: Gen Cao, Ningde (CN); Wencai Xu, Ningde (CN); Jihua Yao, Ningde (CN); Wenwen Liu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 99 days.

(21) Appl. No.: 16/227,224

(22) Filed: Dec. 20, 2018

(65) Prior Publication Data
US 2019/0207178 A1    Jul. 4, 2019

(30) Foreign Application Priority Data

Dec. 29, 2017    (CN) .......................... 2017 1 1477048

(51) Int. Cl.
*H01M 2/10*    (2006.01)
*H01M 10/04*    (2006.01)

(52) U.S. Cl.
CPC ....... *H01M 2/1077* (2013.01); *H01M 2/1061* (2013.01); *H01M 10/0481* (2013.01); *H01M 2220/20* (2013.01)

(58) Field of Classification Search
CPC .... H01M 2/1077; H01M 2/1061; H01M 2/10; H01M 10/0481; H01M 2220/20
See application file for complete search history.

(56) References Cited

U.S. PATENT DOCUMENTS

2015/0144409 A1* 5/2015 Fujii ..................... B60L 3/0046
180/65.1
2017/0352850 A1* 12/2017 Nagane ............... H01M 2/1077

FOREIGN PATENT DOCUMENTS

| CN | 206727139 U | | 12/2017 |
| EP | 3506389 | * | 12/2012 |
| EP | 2874201 A1 | | 5/2015 |

OTHER PUBLICATIONS

The extended European Search Report for European Application No. 18213208.4, dated Apr. 25, 2019, 8 pages.

* cited by examiner

*Primary Examiner* — Stephen J Yanchuk
(74) *Attorney, Agent, or Firm* — Law Offices of Liaoteng Wang

(57) ABSTRACT

The present disclosure relates to a composite end plate for a battery module, comprising: a rigid substrate comprising a first surface and a second surface opposite to each other in a thickness direction of the rigid substrate, wherein the first surface can be provided to face a battery of the battery module, and the rigid substrate comprises two ends opposite to each other in a width direction of the rigid substrate; and a rigid connecting cylinder extending along a height direction of the rigid substrate and made of different material from that of the rigid substrate, wherein two ends of the rigid substrate are connected and fixed to two respective rigid connecting cylinders, and a portion of the rigid connecting cylinder exposed at a side where the second surface is located is connected and fixed to an external structural member.

14 Claims, 7 Drawing Sheets

COMPOSITE END PLATE AND BATTERY MODULE

CROSS-REFERENCE TO RELATED APPLICATION

This application claims priority to Chinese Patent Application No. 201711477048.1, filed on Dec. 29, 2017, which is hereby incorporated by reference in its entirety.

TECHNICAL FIELD

The present disclosure relates to the field of battery technology, and in particular, to a composite end plate and a battery module.

BACKGROUND

With the development of technology, the application of a power battery is becoming more and more extensive, which involves production or life. The power battery is also called a secondary battery which is a rechargeable battery. The power battery is widely used. Low-capacity power battery can be used in small electric vehicles, and high-capacity power battery can be used in large electric vehicles such as hybrid or electric vehicles. When the power battery is used in groups, it is necessary to connect each power battery in series or in parallel via a bus bar. Usually, the bus bar is weld to the positive and negative terminals of the power battery. Each power battery includes a plurality of battery modules. Each battery module includes a plurality of batteries and end and side plates for fixing the plurality of batteries. The end and side plates are provided around the batteries. In the prior art, the end plates are of an integrated structure. The end and side plates are fixedly mounted by welding. As the capacity of the battery module is increasing, the batteries will expand in some cases. Thus, expansion force may be applied to the end and side plates, thereby causing the end and side plates to be easily deformed and displaced and further causing the weld between the side and end plates failure. Therefore, there is a problem that the conventional battery module has low structural strength.

SUMMARY

Embodiments of the present disclosure provide a composite end plate and a battery module. When applied to the battery module, the composite end plate can be firmly connected to the side plate, thereby effectively counteracting the expansion deformation force of the batteries, preventing the overall size of the battery module from becoming large, and enabling safe and reliable use of the battery module.

On one aspect, the prevent disclosure is provided with a composite end plate for a battery module, comprising: a rigid substrate comprising a first surface and a second surface opposite to each other in a thickness direction of the rigid substrate, wherein the first surface can be provided to face a battery of the battery module, and the rigid substrate comprises two ends opposite to each other in a width direction of the rigid substrate; and a rigid connecting cylinder extending along a height direction of the rigid substrate and made of different material from that of the rigid substrate, wherein two ends of the rigid substrate are connected and fixed to two respective rigid connecting cylinders, and a portion of the rigid connecting cylinder exposed at a side where the second surface is located is connected and fixed to an external structural member.

According to one embodiment of the present disclosure, the rigid substrate and the rigid connecting cylinder are both made of metal material; or the rigid substrate is made of non-metal material and the rigid connecting cylinder is made of metal material.

According to one embodiment of the present disclosure, the composite end plate further comprises a positioning connector by which the rigid connecting cylinder is aligned and connected to the rigid substrate.

According to one embodiment of the present disclosure, the positioning connector comprises a positioning rib provided on the rigid connecting cylinder and a positioning recess provided on the rigid substrate, and the positioning rib and the positioning recess have corresponding shapes and can be engaged and connected with each other.

According to one embodiment of the present disclosure, the composite end plate further comprises a fastener by which the positioning rib is connected and fixed to the rigid substrate.

According to one embodiment of the present disclosure, the positioning rib is provided with a through hole extending in the thickness direction, the rigid substrate is provided with a connecting through hole extending in the thickness direction and in communication with the positioning recess, and the fastener is provided through the through hole and the connecting through hole.

According to one embodiment of the present disclosure, the rigid substrate comprises a receiving portion for receiving the rigid connecting cylinder, the receiving portion is recessed from the second surface toward the first surface, the positioning recess is in communication with the receiving portion, and a portion of an outer peripheral surface of the rigid connecting cylinder and a surface of the receiving portion have the same contour and contact and fit with each other.

According to one embodiment of the present disclosure, the outer peripheral surface of the rigid connecting cylinder has a dent which is recessed toward its axis, the dent comprises a first positioning side surface, a bottom surface and a second positioning side surface successively distributed along its circumferential direction, the positioning rib is provided on the bottom surface, and the first positioning side surface, the bottom surface and the second positioning side surface contact and fit with the surface of the receiving portion.

According to one embodiment of the present disclosure, the outer peripheral surface of the rigid connecting cylinder further comprises a connecting flat surface which is exposed at the side where the second surface is located and which is connected to the first positioning side surface, the connecting flat surface can be connected to the external structural member.

According to one embodiment of the present disclosure, the outer peripheral surface of the rigid connecting cylinder further comprises a limiting flat surface perpendicular to the connecting flat surface and an arced transition surface for connecting the connecting flat surface with the limiting flat surface, and the limiting flat surface is connected to the second positioning side surface.

According to one embodiment of the present disclosure, the first positioning side surface and the second positioning side surface are both flat surface and perpendicular to each other.

The composite end plate of the embodiment of the present disclosure includes a rigid substrate and a rigid connecting cylinder. The rigid connecting cylinder is connected and fixed to the rigid substrate. At two opposite ends of the rigid substrate in the width direction X thereof are respectively provided one rigid connecting cylinder. The surface of the rigid connecting cylinder exposed at the side of the rigid substrate where the second surface is located can be connected and fixed to an external structural member. The rigid connecting cylinder enables the connection of the rigid substrate and the external structural member. It is flexible to select the material of the rigid substrate, so that material having small density can be selected, thereby reducing the weight of the whole composite end plate and thus reducing the weight of the whole battery module. The rigid connecting cylinder and the external structural member may be made of the same material and be welded to each other. In this way, the rigid connecting cylinder and the external structural member can be connected and fixed by welding, and the weld formed between them has high strength and strong tensile strength, so that the composite end plate can withstand larger expensive deformation force of the batteries and the structural reliability of the whole battery module is improved.

On a further aspect, the present disclosure is provided with a battery module, comprising: a plurality of batteries arranged side by side; and a fixing frame enclosing all the batteries at a periphery of the batteries, wherein the fixing frame comprises two composite end plates described above and two side plates, the composite end plates and the side plates are alternately provided around the batteries, and the side plates are made of the same material as that of the rigid connecting cylinder and connected to a portion of the rigid connecting cylinder exposed at the side where the second surface is located.

BRIEF DESCRIPTION OF THE DRAWINGS

Features, advantages, and technical effects of the exemplary embodiments of the present disclosure will be described below with reference to the accompanying drawings.

Figure 1:
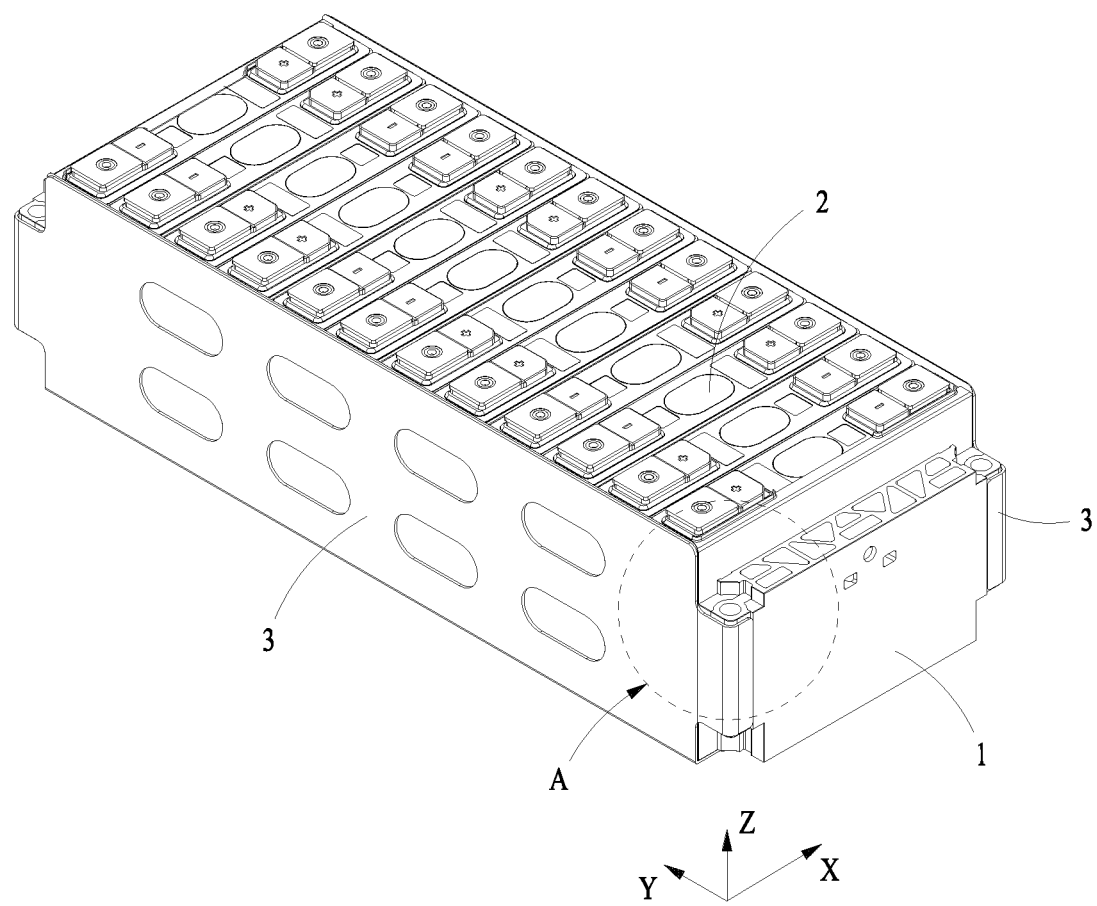
FIG. 1 is a schematic view showing the overall structure of a battery module according to an embodiment of the present disclosure.

In the drawings, the drawings are not drawn to scale.

DESCRIPTION OF REFERENCE SIGNS

1 composite end plate
11 rigid substrate
11a first surface
11b second surface
11c end
11d intermediate connecting portion
110 central axis
111 prefabricated through hole
112 connecting through hole
113 yield hole
114 receiving portion
115 positioning recess
X width direction
Y thickness direction
Z height direction
12 rigid connecting cylinder
120 mounting hole
121 dent
121a first positioning side surface
121b bottom surface
121c second positioning side surface
122 connecting flat surface
123 limiting flat surface
124 arced transition Surface
125 positioning rib
125a through hole
2 battery
3 side plate
4 fastener

DETAILED DESCRIPTION

Below, embodiments of the present disclosure will be further described in detail with reference to the drawings and embodiments. The detailed description of the embodiments and the accompanying drawings are intended to exemplarily illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality of" is two or more; the orientation or position relationship indicated by the terms "upper", "lower", "left", "right", "inside", "outside" and the like is merely for the purpose of describing the present disclosure and simplifying the description, is not intended to indicate or imply that the device or component referred to has a particular orientation and is constructed and operated in a particular orientation, and thus cannot be understood as a limitation of the present disclosure. Moreover, the terms "first", "second" and the like are used for descriptive purposes only and are not to be understood as indicating or implying relative importance.

In the description of the present disclosure, it should be noted that, unless otherwise provided and defined definitely, the terms "mount", "connected to", and "connected with" should be understood broadly and may be, for example, understood as a fixed, disassemble, or integral connection; they can be connected directly or indirectly through an intermediate medium. The specific meaning of the above terms in the present disclosure can be understood by the person skilled in the art according to particular circumstance.

For better understanding the present disclosure, a composite end plate 1 according to embodiments of the present disclosure will be described in detail below with reference to FIG. 1 to FIG. 7.

Figure 2:
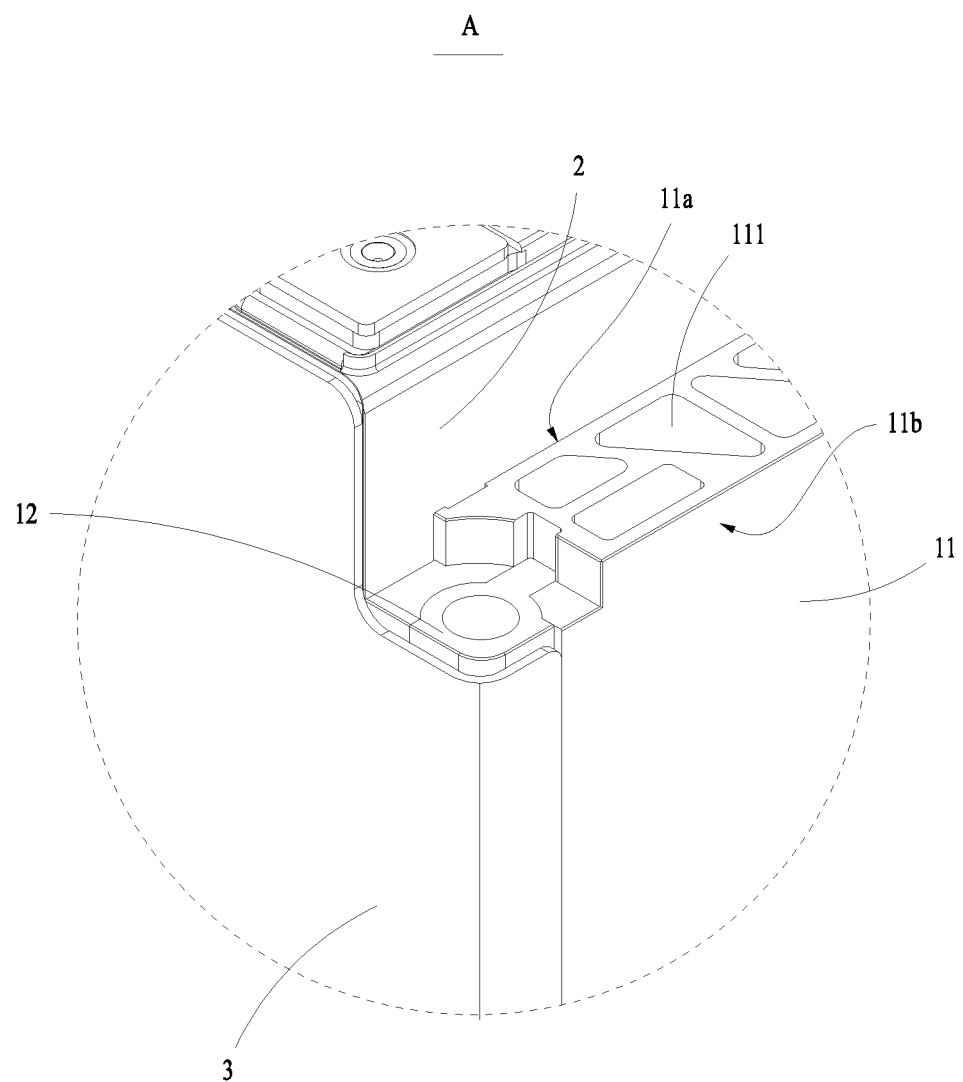
FIG. 2 is a partial enlarged view of the portion A in FIG. 1.
Figure 3:
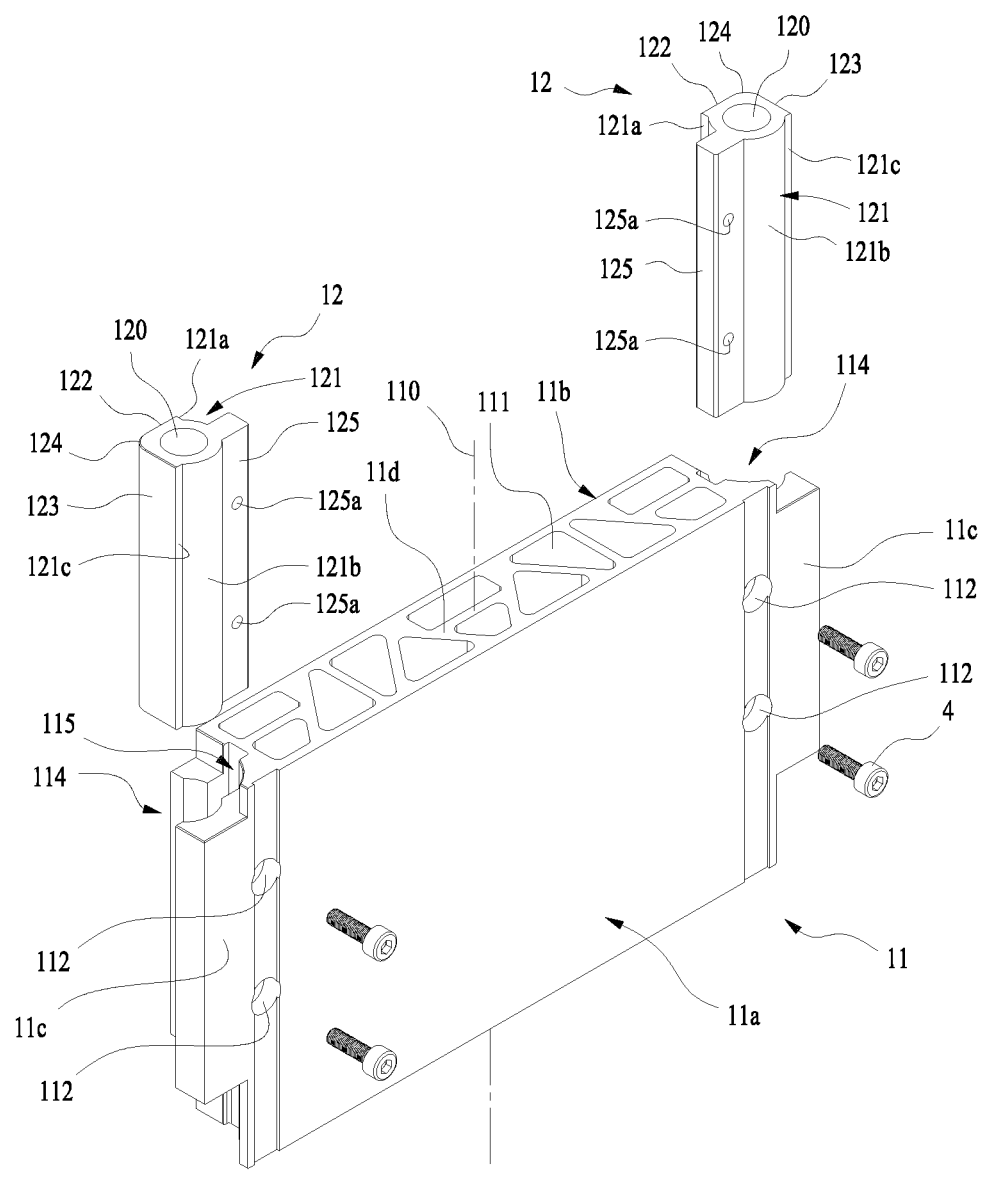
FIG. 3 is a schematic exploded view showing a composite end plate according to an embodiment of the present disclosure.
Figure 4:
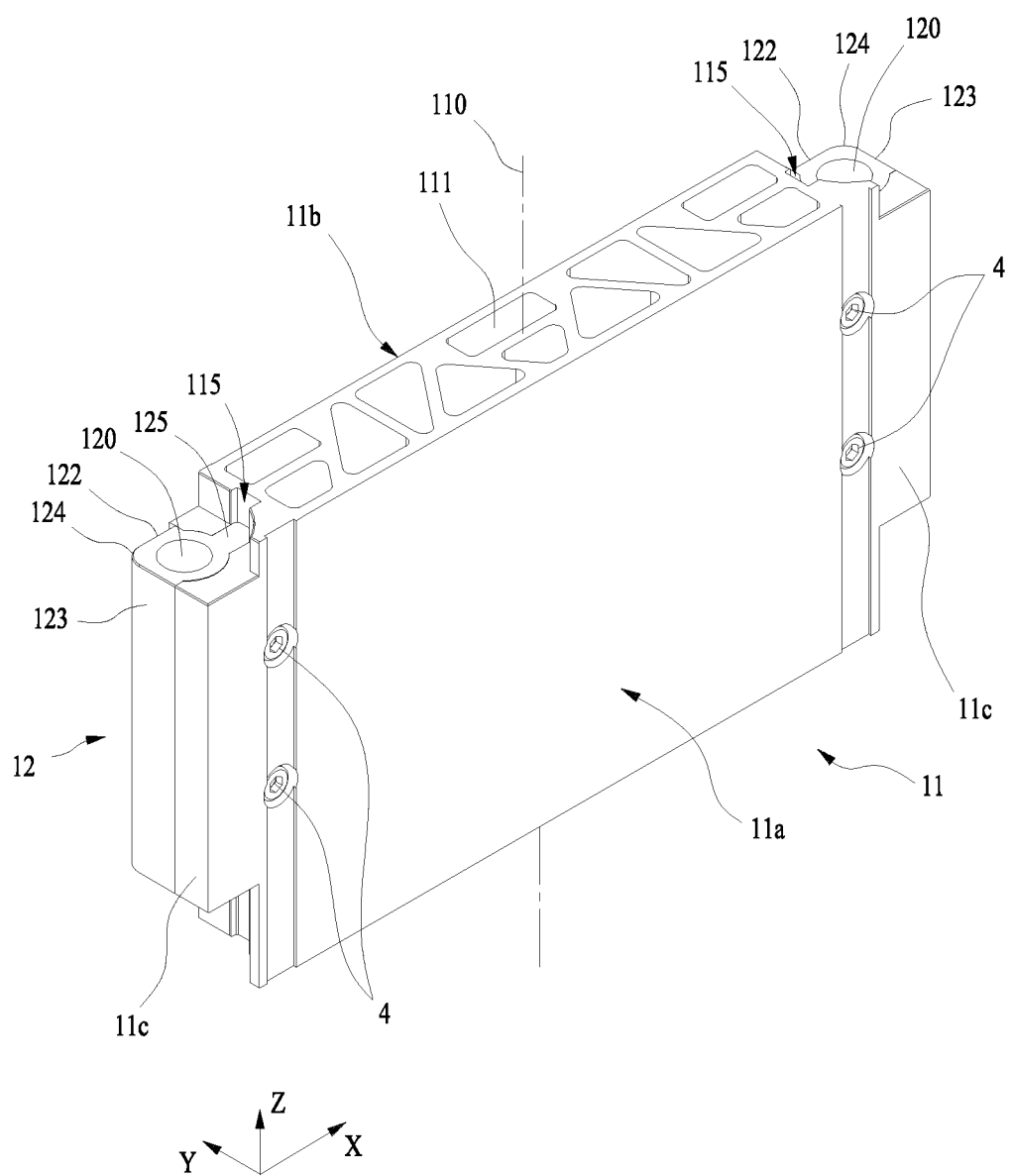
FIG. 4 is a schematic view showing the overall structure of a composite end plate according to an embodiment of the present disclosure.

FIG. 1 schematically shows an overall structure of a battery module of an embodiment. FIG. 2 is a partial enlarged view of the portion A in FIG. 1. FIG. 3 schematically shows an exploded structure of a composite end plate 1 of an embodiment. FIG. 4 schematically shows an overall structure of a composite end plate 1 of an embodiment. FIG.

Figure 6:
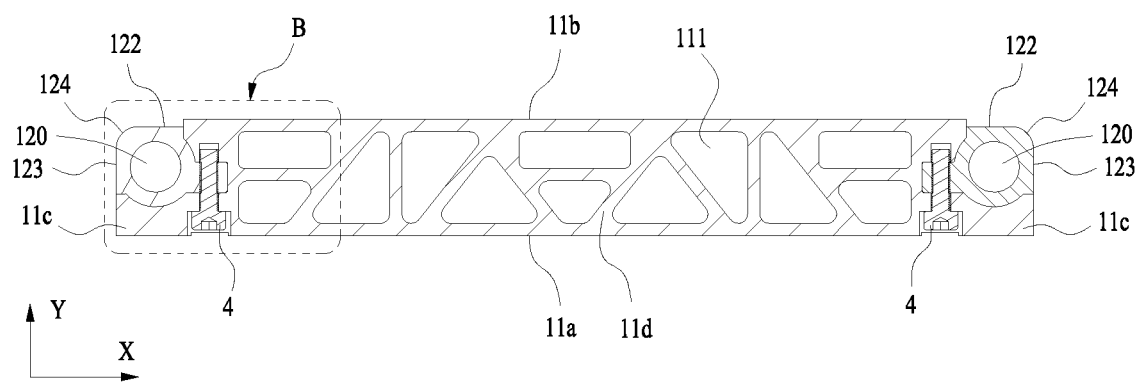
FIG. 6 is a cross-sectional structural view showing a composite end plate according to an embodiment of the present disclosure.
Figure 7:
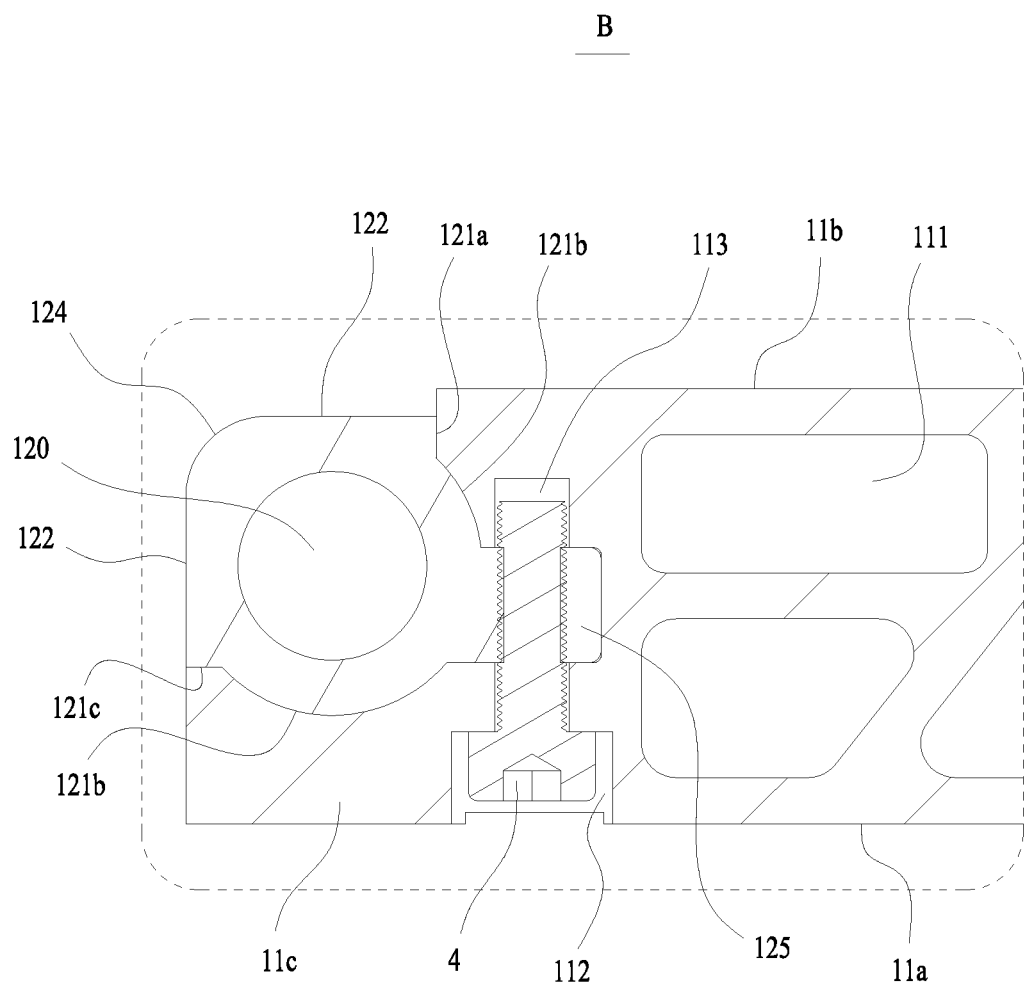
FIG. 7 is a partial enlarged view of the portion B in FIG. 6.

5 schematically shows a sectional structure of an exemplary rigid substrate 11. FIG. 6 schematically shows a sectional structure of a composite end plate 1 of another embodiment. FIG. 7 is a partial enlarged view of the portion B in FIG. 6.

As shown in FIG. 1, the composite end plate 1 of the embodiment of the present disclosure is used for a battery module. The battery module of this embodiment includes a plurality of batteries 2 arranged in one direction and two composite end plates 1 and two side plates 3 of the embodiment of the present disclosure. The plurality of batteries 2 form an assembly. The two composite end plates 1 are respectively provided on opposite sides of the assembly in a direction in which the batteries 2 are arranged. The two side plates 3 are respectively provided at intervals in a direction perpendicular to the direction in which the batteries 2 are arranged and are respectively connected to the two composite end plates 1. The two composite end plates 1 together with the two side plates 3 form a fixing frame for fixing the assembly. A plurality of holes may be provided in the side plates 3 to reduce the weight thereof and to facilitate the heat dissipation of the batteries 2.

As shown in FIG. 2, the composite end plate 1 of the embodiment of the present disclosure includes a rigid substrate 11. The rigid substrate 11 of the embodiment has a predetermined width, thickness, and height, and its size can be flexibly selected according to actual needs. The rigid substrate 11 has a first surface 11a and a second surface 11b opposite to each other in a thickness direction Y thereof. When the composite end plate 1 is used for the battery module, the first surface 11a of the rigid substrate 11 may be provided facing the battery 2. Generally, the first surface 11a is a flat surface so as to fit integrally with the large flat surface of the battery 2 having a square structure, thereby avoiding squeezing a housing of the battery 2. The second surface 11b of the rigid substrate 11 faces away from the battery 2 and towards the external environment.

As shown in FIG. 3 and FIG. 4, the rigid substrate 11 of the embodiment includes two ends 11c opposite to each other in a width direction X and an intermediate connecting portion 11d provided between the two ends 11c. A plurality of prefabricated through holes 111 extending in a height direction Z are provided in the intermediate connecting portion 11d. The rigid substrate 11 includes a top portion and a bottom portion opposite to each other in a height direction Z. Each prefabricated through holes 111 extends through the top portion and the bottom portion of the rigid substrate 11. On the one hand, the rigid substrate 11 having the prefabricated through holes 111 has low weight, which enables the weight reduction of the whole battery module; on the other hand, the rigid substrate 11 having the prefabricated through holes 111 has good rigidity, which enhances its resistance to deformation and enables the rigid substrate 11 to withstand larger stress without deformation; further, the prefabricated through holes 111 of the rigid substrate 11 can serve as a heat dissipation channel for facilitating the heat dissipation of the battery adjacent to the rigid substrate 11 so as to reduce the temperature of the battery. Optionally, the shape of the cross-section of the prefabricated through holes 111 may be circular, rectangular, or triangular.

The composite end plate 1 of the embodiment of the present disclosure further includes rigid connecting cylinders 12 fixedly connected to the rigid substrate 11. The rigid connecting cylinder 12 has a mounting hole 120 that extends in the height direction Z. When the composite end plate 1 are applied to the battery module, the batteries 2, the composite end plates 1, and the side plates 3 are assembled into the battery module, and then the whole battery module is connected fixedly to an external structural member via the rigid connecting cylinders 12. For example, the external structural member may be a battery case for receiving the battery module. Optionally, a screw is used to pass through the mounting hole 120 provided in the rigid connecting cylinder 12 and be threaded to the external structural member so as to fix the position of the battery module.

The composite end plate 1 of the embodiment includes two rigid connecting cylinders 12. The rigid connecting cylinders 12 of the embodiment extend in the height direction Z of the rigid substrate 11. One rigid connecting cylinder 12 is provided at each end 11c of the rigid substrate 11 such that the two rigid connecting cylinders 12 are spaced apart in the width direction X of the rigid substrate 11. A portion of the rigid connecting cylinder 12 exposed at the side where the second surface 11b is located is connected and fixed to the side plate 3. When the composite end plate 1 is applied to the battery module, one of the side plates 3 is connected and fixed to one of the rigid connecting cylinders 12, and the other side plate 3 is connected and fixed to the other rigid connecting cylinder 12. Thus, under the connection of the rigid connecting cylinders 12, the side plate 3 is connected and fixed to the whole composite end plate 1 by the rigid connecting cylinders 12.

In the case that there are two rigid connecting cylinders 12 provided on the composite end plate 1 of the embodiment, the two rigid connecting cylinders 12 are symmetrically provided with respect to a central axis 110 of the rigid substrate 11. The central axis 110 extends in the height direction Z of the rigid substrate 11. When the two rigid connecting cylinders 12 are respectively subjected to the force of the side plates 3, the composite end plate 1 as a whole may be in a state of force balance, thus preventing, after the composite end plate 1 is subjected to the force, that the rotational moment generated on one side of the composite end plate 1 in the width direction X of the rigid substrate 11 is larger than that on the other side thereof such that the composite end plate 1 as a whole rotates about the central axis 110 of the rigid substrate 11, and improving the positional stability of the whole composite end plate 1.

The rigid connecting cylinders 12 of the embodiment are made of different material from the rigid substrate 11. Optionally, the rigid substrate 11 and the rigid connecting cylinder 12 are both made of metal material, or the rigid substrate 11 is made of a non-metal material and the rigid connecting cylinder 12 is made of metal material. The rigid connecting cylinder 12 is made of the same material as the side plate 3. The free ends of the two side plates 3 each can be folded onto the side of the rigid substrate 11 where the second surface 11b is located, and are welded to the portion of the rigid connecting cylinder 12 exposed at the side of the rigid substrate 11 where the second surface 11b is located. When expensive deformation of the batteries 2 occurs, the expensive deformation force can stretch the side plates 3 such that the side plates 3 are mainly subjected to tensile stress. After the two side plates 3 and the two composite end plates 1 are connected and fixed, the side plates 3 together with the composite end plates 1 can compress the plurality of batteries 2 so as to counteract the expensive deformation force generated when the expansion of the batteries 2 occurs.

In an embodiment, the side plates 3 and the rigid connecting cylinders 12 are made of steel such that they can be connected and fixed by welding, which is simple and easy to operate. In the case that the side plates 3 of the battery module are made of steel, since the steel has large yield strength, the stress generated on the side plate 3 is smaller than the yield strength of the steel when the expansive force of the battery 2 is applied on the side plate 3, thereby effectively ensuring that large tensile deformation of the side plate 3 may not occur. Thus, the battery module structure using the steel side plates 3 can effectively prevent deformation of the battery module, thereby ensuring that the length of the battery module meets the design requirements. Preferably, the side plates 3 and the rigid connecting cylinders 12 are made of stainless steel, which has high connection strength and good corrosion resistance.

The side plates 3 and the rigid connecting cylinders 12 made of steel are welded to each other to form a welded portion having high connection strength. Thus, the strength of the weld between the side plate 3 and the rigid connecting cylinder 12 is large and the tensile stress of the weld is increased, so that the composite end plate 1 can withstand larger expensive deformation force of the batteries 2, the welded portion can be prevented from being pulled open easily under the expensive deformation force generated during the expensive deformation of the batteries 2, the structural reliability of the whole battery module is improved, and the dimension of the battery module is prevented from being changed under the expensive deformation of the batteries 2. It can be understood that the side plates 3 and the rigid connecting cylinders 12 can also be other identical metal material which meets the connection strength requirements.

In the embodiment of the present disclosure, since the composite end plate 1 is connected to the side plates 3 via the rigid connecting cylinders 12, it is more flexibly to select the material of the rigid substrate 11. The rigid substrate 11 may be made of a material having lower density, provided that the connection rigidity between the side plates 3 and the rigid connecting cylinders 12 of the same metal material meets the requirements. Optionally, the material of the rigid substrates 11 may be engineering plastic, glass reinforced plastic, or carbon fiber, so that the composite end plate 1 and thus the battery module can be reduced in weight. Optionally, the material of the rigid substrate 11 may also be aluminum or aluminum alloy, which is convenient for processing by extrusion molding and machining molding.

The composite end plate 1 of the embodiment of the present disclosure further includes a positioning connector. The rigid connecting cylinder 12 is aligned and connected to the rigid substrate 11 by the positioning connector. The positioning connector enables the rigid connecting cylinder 12 and the rigid substrate 11 to be positioned quickly and accurately with each other, and meanwhile to be connected to form the composite end plate 1. The assembly efficiency and accuracy of the rigid substrate 11 and the rigid connecting cylinder 12 can be improved by using the positioning connector.

In an embodiment, as shown in FIG. 3, the positioning connector includes a positioning rib 125 provided on the rigid connecting cylinder 12 and a positioning recess 115 provided on the rigid substrate 11. Both the positioning rib 125 and the positioning recess 115 extend in the height direction Z of the rigid substrate 11. The positioning rib 125 and the rigid connecting cylinder 12 of the embodiment are of a one-piece structure. The positioning recess 115 is directly provided on the rigid substrate 11. It will be readily understood that the positioning rib 125 can be a separate member which is detachably connected to the rigid connecting cylinder 12. The positioning recess 115 may be provided on a separate member, and then the separate member is detachably connected to the rigid substrate 11. The embodiment, in which the positioning rib 125 and the rigid connecting cylinder 12 are of a one-piece structure and the positioning recess 115 is directly provided on the rigid substrate 11, is mainly used to describe the technical solutions of the present disclosure and does not limit the protection scope of the patent.

The positioning rib 125 provided on the rigid connecting cylinder 12 and the positioning recess 115 on the rigid substrate 11 of the embodiment have corresponding shapes and both extend in the height direction Z of the rigid substrate 11. When the positioning rib 125 provided on the rigid connecting cylinder 12 is inserted into the positioning recess 115 on the rigid substrate 11, the positioning rib 125 coincides with the positioning recess 115. In this way, they are both in close contact with each other to ensure that the positioning accuracy meets the requirements. In addition, when the rigid connecting cylinder 12 is subjected to the force of the side plate, the positioning rib 125 of the rigid connecting cylinder 12 will not sway or shift within the positioning recess 115. On the one hand, they are prevented from being worn out due to frequent shift relative to each other. On the other hand, the connection stability and the deformation resistance of the rigid connecting cylinder 12 and the rigid substrate 11 are improved. Optionally, the positioning recesses 115 are provided at two opposite ends 11c of the rigid substrate 11 in the width direction X thereof.

In an embodiment, the positioning rib 125 is in an interference fit with the positioning recess 115. The positioning rib 125 is gradually pushed into the positioning recesses 115 by applying pressure to the positioning ribs 125, thereby achieving connection and fixing of them. Thus, the assembly of the rigid connecting cylinder 12 and the rigid substrate 11 is convenient and has few processes and high efficiency.

In an embodiment, the outer surface of the positioning rib 125 and/or the corresponding inner surface of the positioning recess 115 are pre-coated with adhesive, and then the positioning rib 125 is inserted into the positioning recess 115. After the aging treatment, the positioning rib 125 can be firmly bonded to the surface of the rigid substrate 11 on which the positioning recess 115 is formed. Thus, the requirement on the processing precision of the positioning rib 125 of the rigid connecting cylinder 12 and the positioning recesses 115 on the rigid substrate 11 is low, thereby reducing processing difficulty and cost and improving processing efficiency.

In an embodiment, the positioning rib 125 of the rigid connecting cylinder 12 is connected and fixed to the rigid substrate 11 by a fastener 4. After the positioning rib 125 is matched with the positioning recess 115 provided on the rigid substrate 11, the positioning rib 125 and the rigid substrate 11 are connected by the fastener 4 to improve the connection strength between the rigid connecting cylinder 12 and the rigid substrate 11.

Optionally, the fastener 4 is a resilient buckle provided on the positioning rib 125. A clamping groove is provided on the surface of the rigid substrate 11 where the positioning recess 115 is formed. The clamping groove is in communication with the positioning recess 115. When the positioning rib 125 is engaged with the positioning recess 115, the buckle provided on the positioning rib 125 can be bounced into the clamping groove to lock the positioning rib 125 and the rigid substrate 11. Thus, the connection of the rigid connecting cylinder 12 and the rigid substrate 11 is convenient, quick and easy to operate.

Optionally, the positioning rib 125 is provided with a through hole 125a extending in the thickness direction Y of the rigid substrate 11. The rigid substrate 11 is provided with a connecting through hole 112 extending in the thickness direction Y of the rigid substrate 11. The connecting through hole 112 is in communication with the positioning recess 115. After the positioning rib 125 is matched with the positioning recess 115, the through hole 125a on the positioning rib 125 is aligned with the connecting through hole 112 provided on the rigid substrate 11. The fastener 4 passes through the through hole 125a and the connecting through hole 112, and meanwhile the fastener 4 connects the rigid connecting cylinder 12 with the rigid substrate 11.

In an example, the fastener 4 is a locking pin. A portion of the locking pin is located in the through hole 125a, and the other portion thereof is located in the connecting through hole 112, thereby locking the positioning rib 125 onto the rigid substrate 11. The locking pin is easy to mount and enables a reliable connection.

In an example, the fastener 4 is a screw. The through hole 125a provided in the positioning rib 125 is a threaded hole. The thread of the screw passes through the connecting through hole 112 on the rigid substrate 11 and is in threaded connection with the through hole 125a, the cap is in contact with the rigid substrate 11, and therefore the locking is achieved. Further, the rigid substrate 11 is further provided with a yield hole 113 provided coaxially with the connecting through hole 112. The yield hole 113 is in communication with the positioning recess 115. The connecting through hole 112, the positioning recess 115, and the yield hole 113 are sequentially provided in the thickness direction Y of the rigid substrate 11. The portion of the screw passing through the through hole 125a can enter into the yield hole 113 such that the size of the screw may be various, and both ends of the screw are connected to the rigid substrate 11 such that the connection strength is improved. Further, the connecting through hole 112 is a stepped hole such that the cap of the screw can fall into the rigid substrate 11 so as to prevent at least a part of the cap from protruding from the first surface 11a of the rigid substrate 11 and interfering with other components, or to prevent the portion of the cap protruding from pressing the casing of the battery 2 and causing deformation of the casing, which affects the safety of use of the battery 2.

Figure 5:
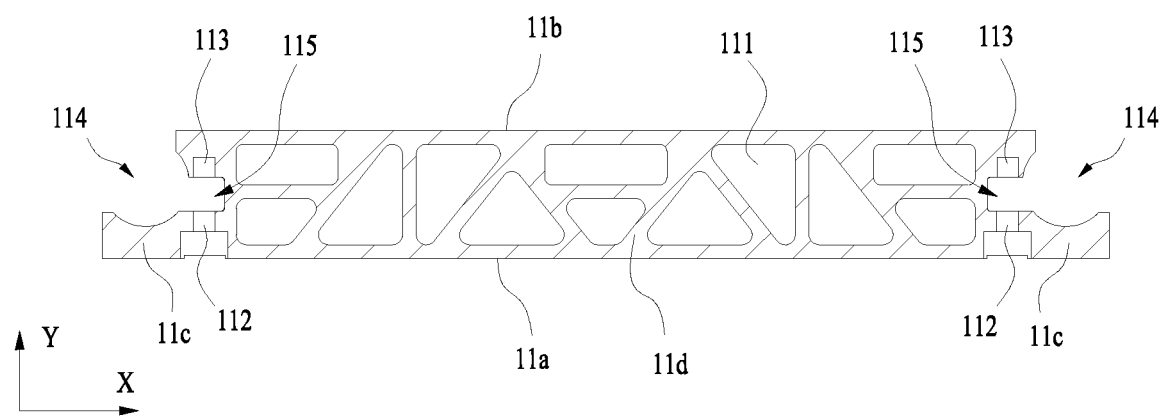
FIG. 5 is a cross-sectional structural view showing a rigid substrate according to an embodiment of the present disclosure.

As shown in FIG. 3 and FIG. 5, the rigid substrate 11 of the embodiment of the present disclosure includes a receiving portion 114 for receiving the rigid connecting cylinder 12. The receiving portion 114 is recessed from the second surface 11b toward the first surface 11a. The positioning recess 115 is in communication with the receiving portion 114. The receiving portion 114 of the embodiment is provided at the end 11c of the rigid substrate 11. The opening of the positioning recess 115 is oriented perpendicular to the thickness direction Y of the rigid substrate 11. The width of the first surface 11a of the rigid substrate 11 is greater than the width of the second surface 11b. Thus, the portion of the rigid substrate 11 forming the receiving portion 114 can form a limiting region. In the thickness direction Y of the rigid substrate 11, the rigid connecting cylinder 12 provided in the receiving portion 114 is pressed against the limiting region to be limited by the limiting region, so that when tensile stress is applied to the rigid connecting cylinder 12 by the side plate, the limit region applies supporting force toward the second surface 11b to the rigid connecting cylinder 12. A portion of an outer peripheral surface of the rigid connecting cylinder 12 and the surface of the receiving portion 114 have the same contour so as to contact and fit with each other, thereby avoiding a gap between them and improving the positioning accuracy and the connection stability of them.

In an embodiment, as shown in FIG. 3, the outer peripheral surface of the rigid connecting cylinder 12 has a dent 121 which is recessed toward its axis. The dent 121 extends along the axial direction of the rigid connecting cylinder 12. As shown in FIG. 6 and FIG. 7, the dent 121 of the embodiment includes a first positioning side surface 121a, a bottom surface 121b, and a second positioning side surface 121c which are successively distributed along the circumferential direction of the rigid connecting cylinder 12. The first positioning side surface 121a, the bottom surface 121b, and the second positioning side surface 121c contact and fit with the surface of the receiving portion 114. The positioning rib 125 is provided to the bottom surface 121b. The first positioning side surface 121a of the rigid connecting cylinder 12 is near the second surface 11b of the rigid substrate 11, and the second positioning side surface 121c is near the first surface 11a of the rigid substrate 11.

After the first positioning side surface 121a of the rigid connecting cylinder 12 of the embodiment is in contact with the corresponding surface of the receiving portion 114, the position of the rigid connecting cylinder 12 can be limited in the width direction X of the rigid substrate 11. After the second positioning side surface 121c of the rigid connecting cylinder 12 is in contact with the corresponding surface of the receiving portion 114, the position of the rigid connecting cylinder 12 can be limited in the thickness direction Y of the rigid substrate 11. In this way, the rigid connecting cylinder 12 can simultaneously withstand the external force in the width direction X and the thickness direction Y of the rigid substrate 11, thereby effectively reducing the stress carried by the positioning rib 125 such that the rigid connecting cylinder 12 has large carrying capacity and good position stability.

Optionally, the first positioning side surface 121a and the second positioning side surface 121c are both flat surfaces. The bottom surface 121b is a cylindrical surface. Both the first positioning side surface 121a and the second positioning side surface 121c intersect with the bottom surface 121b. Preferably, the first positioning side surface 121a and the second positioning side surface 121c are perpendicular to each other, thereby improving the positioning accuracy and reducing the manufacture difficulty. At the same time, the rigid connecting cylinder 12 can withstand the stress more effectively in the width direction X and the thickness direction Y of the rigid substrate 11. Optionally, the bottom surface 121b extends in the circumferential direction of the rigid connecting cylinder 12 by at least a quarter circle.

In an embodiment, the outer peripheral surface of the rigid connecting cylinder 12 further includes a connecting flat surface 122 which is exposed at the side where the second surface 11b is located and which is connected to the first positioning side surface 121a. The connecting flat surface 122 is connected to the side plate 3 included in the battery module. The rigid connecting cylinder 12 is more easily connected and fixed to the side plate 3 and can tightly and seamlessly fit with the side plate 3 through the connecting flat surface 122. Optionally, the side plate 3 and the rigid connecting cylinder 12 are both made of steel material, so that they can be connected and fixed by welding, and the connection is simple and easy to operate. A welded portion having high connection strength is formed on the connecting flat surface 122 after the side plate 3 and the rigid connecting cylinder 12 made of steel material are welded to each other. The second surface 11b of the embodiment is a flat surface. The connecting flat surface 122 of the embodiment may be flush with the second surface 11b of the rigid substrate 11. The vertical distance between the connecting flat surface 122 and the second surface 11b is equal to the thickness of the side plate 3, so that the surface of the side plate 3 facing away from the first surface 11a is flush with the second surface 11b after the side plate 3 is welded to the connecting flat surface 122.

In an embodiment, the outer peripheral surface of the rigid connecting cylinder 12 further includes a limiting flat surface 123 perpendicular to the connecting flat surface 122 and an arced transition surface 124 for connecting the connecting flat surface 122 with the limiting flat surface 123. The limiting flat surface 123 of the embodiment is connected to the second positioning side surface 121c. Optionally, the limiting flat surface 123 is aligned with the side surface of the rigid substrate 11 which is located at the end 11c and adjacent to the limiting flat surface 123, so that the opposite side surfaces of the composite end plate in the width direction X are both flat surface and parallel to each other. The side plate 3 includes two ends and a body provided between the two ends. The free ends of the side plate 3 are folded onto the side of the rigid substrate 11 where the second surface 11b is located and are connected and fixed to the connecting flat surface 122, and the body of the side plate 3 contact and fit with the limiting flat surface 123. The contour formed by the free ends and the body of the side plate 3 matches the contour formed by the connecting flat surface 122, the arced transition surface 124, and the limiting flat surface 123 of the rigid connecting cylinder 12. In this way, by providing the arced transition surface 124 on the rigid connecting cylinder 12, the bending region of the side plate 3 has smooth transition, thereby avoiding stress concentration in the region where the arced transition surface 124 is located produced by the rigid connecting cylinder 12 and the side plate 3.

The composite end plate of the embodiment of the present disclosure includes a rigid substrate 11 and a rigid connecting cylinder 12. The rigid connecting cylinder 12 is connected and fixed to the rigid substrate 11. At two opposite ends 11c of the rigid substrate 11 in the width direction X thereof are respectively provided one rigid connecting cylinder 12. The surface of the rigid connecting cylinder 12 exposed at the side of the rigid substrate 11 where the second surface 11b is located can be connected and fixed to an external structural member such as a side plate 3. The rigid connecting cylinder 12 enables the connection of the rigid substrate 11 and the external structural member. The side plate 3 can be connected and fixed to the rigid substrate 11 through the rigid connecting cylinder 12, thereby facilitating to select the side plates 3 and the rigid connecting cylinder 12 of different materials according to actual application requirements. It is also flexible to select the material of the rigid substrate 11, so that material having small density can be selected, thereby reducing the weight of the whole composite end plate and thus reducing the weight of the whole battery module. The rigid connecting cylinder 12 and the side plates 3 may be made of the same material and be welded to each other. In this way, the rigid connecting cylinder 12 and the side plate 3 can be connected and fixed by welding, and the weld formed between them has high strength and strong tensile strength, so that the composite end plate 1 can withstand larger expensive deformation force of the batteries and the structural reliability of the whole battery module is improved.

The embodiment of the present disclosure further provides a battery module including a plurality of batteries 2 and a fixing frame. A plurality of batteries 2 are arranged side by side in one direction. The fixing frame encloses all the batteries at a periphery of the batteries so as to fix the plurality of batteries 2. The fixing frame includes two side plates 3 and two composite end plates 1 of the embodiment described above. A plurality of batteries 2 form an assembly. At two opposite sides of the assembly in an arrangement direction of the batteries 2 is respectively provided a composite end plate 1. The composite end plates 1 and the side plates 3 are alternately provided around the batteries 2. At two opposite sides of the assembly in a direction perpendicular to the arrangement direction of the batteries 2 is respectively provided a side plate 3. The composite end plates 1 and the side plates 3 are alternately provided around the batteries 2. The side plates 3 is made of the same material as the rigid connecting cylinders 12. The two composite end plates 1 provided at both sides of the plurality of batteries 2 are connected by the two side plates 3. Optionally, each side plate 3 has a U-shaped structure, and both ends of the side plate are folded onto the side of the rigid substrate 11 where the second surface 11b is located and are connected and fixed to the rigid connecting cylinder 12.

In an embodiment, the side plates 3 and the rigid connecting cylinder 12 are both made of steel. In this way, the rigid connecting cylinders 12 and the side plates 3 can be connected and fixed by welding, the weld formed by welding has strong strength and thus can withstand greater expensive deformation force produced by the expansion of the batteries, thereby effectively reducing the amount of movement or deformation of the composite end plates 1 in a direction away from the batteries and improving the structural reliability of the whole battery module. Preferably, the material of the side plate 3 and the rigid connecting cylinder 12 are both stainless steel.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A composite end plate for a battery module, comprising:
    a rigid substrate comprising a first surface and a second surface opposite to each other in a thickness direction of the rigid substrate, wherein the first surface can be provided to face a battery of the battery module, and the rigid substrate comprises two ends opposite to each other in a width direction of the rigid substrate;
    a rigid connecting cylinder extending along a height direction of the rigid substrate and made of different material from that of the rigid substrate, wherein two ends of the rigid substrate are connected and fixed to two respective rigid connecting cylinders, and a portion of the rigid connecting cylinder exposed at a side where the second surface is located is connected and fixed to an external structural member;
    further comprising a positioning connector by which the rigid connecting cylinder is aligned and connected to the rigid substrate; and
    wherein the positioning connector comprises a positioning rib provided on the rigid connecting cylinder and a positioning recess provided on the rigid substrate, and the positioning rib and the positioning recess have corresponding shapes and can be engaged and connected with each other.

2. The composite end plate of claim 1, wherein
the rigid substrate and the rigid connecting cylinder are both made of metal material; or
the rigid substrate is made of non-metal material and the rigid connecting cylinder is made of metal material.

3. The composite end plate of claim 1, further comprising a fastener by which the positioning rib is connected and fixed to the rigid substrate.

4. The composite end plate of claim 1, wherein the rigid substrate comprises a receiving portion for receiving the rigid connecting cylinder, the receiving portion is recessed from the second surface toward the first surface, the positioning recess is in communication with the receiving portion, and a portion of an outer peripheral surface of the rigid connecting cylinder and a surface of the receiving portion have the same contour and contact and fit with each other.

5. The composite end plate of claim 4, wherein the outer peripheral surface of the rigid connecting cylinder has a dent which is recessed toward its axis, the dent comprises a first positioning side surface, a bottom surface and a second positioning side surface successively distributed along its circumferential direction, the positioning rib is provided on the bottom surface, and the first positioning side surface, the bottom surface and the second positioning side surface contact and fit with the surface of the receiving portion.

6. The composite end plate of claim 5, wherein the outer peripheral surface of the rigid connecting cylinder further comprises a connecting flat surface which is exposed at the side where the second surface is located and which is connected to the first positioning side surface, the connecting flat surface can be connected to the external structural member, and the first positioning side surface and the second positioning side surface are both flat surface and perpendicular to each other.

7. The composite end plate of claim 6, wherein the outer peripheral surface of the rigid connecting cylinder further comprises a limiting flat surface perpendicular to the connecting flat surface and an arced transition surface for connecting the connecting flat surface with the limiting flat surface, and the limiting flat surface is connected to the second positioning side surface.

8. A battery module, comprising.
a plurality of batteries arranged side by side;
a fixing frame enclosing all the batteries at a periphery of the batteries, wherein the fixing frame comprises two composite end plates according to claim 1 and two side plates, the composite end plates and the side plates are alternately provided around the batteries, and the side plates are made of the same material as that of the rigid connecting cylinder and connected to a portion of the rigid connecting cylinder exposed at the side where the second surface is located;
a positioning connector by which the rigid connecting cylinder is aligned and connected to the rigid substrate; and
the positioning connector comprises a positioning rib provided on the rigid connecting cylinder and a positioning recess provided on the rigid substrate, and the positioning rib and the positioning recess have corresponding shapes and can be engaged and connected with each other.

9. The battery module of claim 8, wherein
the rigid substrate and the rigid connecting cylinder are both made of metal material; or
the rigid substrate is made of non-metal material and the rigid connecting cylinder is made of metal material.

10. The battery module of claim 8, further comprising a fastener by which the positioning rib is connected and fixed to the rigid substrate.

11. The battery module of claim 8, wherein the rigid substrate comprises a receiving portion for receiving the rigid connecting cylinder, the receiving portion is recessed from the second surface toward the first surface, the positioning recess is in communication with the receiving portion, and a portion of an outer peripheral surface of the rigid connecting cylinder and a surface of the receiving portion have the same contour and contact and fit with each other.

12. The battery module of claim 11, wherein the outer peripheral surface of the rigid connecting cylinder has a dent which is recessed toward its axis, the dent comprises a first positioning side surface, a bottom surface and a second positioning side surface successively distributed along its circumferential direction, the positioning rib is provided on the bottom surface, and the first positioning side surface, the bottom surface and the second positioning side surface contact and fit with the surface of the receiving portion.

13. The battery module of claim 12, wherein the outer peripheral surface of the rigid connecting cylinder further comprises a connecting flat surface which is exposed at the side where the second surface is located and which is connected to the first positioning side surface, the connecting flat surface can be connected to the external structural member, and the first positioning side surface and the second positioning side surface are both flat surface and perpendicular to each other.

14. The battery module of claim 13, wherein the outer peripheral surface of the rigid connecting cylinder further comprises a limiting flat surface perpendicular to the connecting flat surface and an arced transition surface for connecting the connecting flat surface with the limiting flat surface, and the limiting flat surface is connected to the second positioning side surface.

\* \* \* \* \*